US012548918B2

(12) United States Patent
Pajona et al.

(10) Patent No.: US 12,548,918 B2
(45) Date of Patent: Feb. 10, 2026

(54) ANTENNA ARRAY ON CURVED AND FLAT SUBSTRATES

(71) Applicant: KYOCERA AVX Components (San Diego), Inc., San Diego, CA (US)

(72) Inventors: Olivier Pajona, Biot (FR); Oussama Hiouas, Nice (FR); Florian Canneva, Cannes (FR)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 492 days.

(21) Appl. No.: 17/886,179

(22) Filed: Aug. 11, 2022

(65) Prior Publication Data

US 2023/0048611 A1 Feb. 16, 2023

Related U.S. Application Data

(60) Provisional application No. 63/232,837, filed on Aug. 13, 2021.

(51) Int. Cl.

*H01Q 21/06* (2006.01)
*H01Q 9/04* (2006.01)
*H01Q 21/20* (2006.01)

(52) U.S. Cl.

CPC ............. *H01Q 21/20* (2013.01); *H01Q 9/045* (2013.01); *H01Q 21/065* (2013.01)

(58) Field of Classification Search

CPC ...... H01Q 21/20; H01Q 21/065; H01Q 21/08; H01Q 21/28; H01Q 9/045; H01Q 9/0435; H01Q 1/38; H01Q 1/241; H01Q 1/242; H01Q 1/243; H01Q 3/30

See application file for complete search history.

(56) References Cited

U.S. PATENT DOCUMENTS

| | | | | |
|---|---|---|---|---|
| 9,196,952 | B2 * | 11/2015 | Tran .......................... | H01Q 7/00 |
| 2009/0256752 | A1 | 10/2009 | Akkermans et al. | |
| 2014/0118196 | A1 | 5/2014 | Koskiniemi | |
| 2018/0062255 | A1 | 3/2018 | Kugler et al. | |

(Continued)

FOREIGN PATENT DOCUMENTS

| | | |
|---|---|---|
| JP | H 03254207 | 11/1991 |
| JP | H 11274830 | 10/1999 |
| JP | 2005051506 | 7/2008 |

OTHER PUBLICATIONS

PCT International Search Report and Written Opinion for corresponding PCT Application No. PCT/US2022/040044, mailed on Dec. 2, 2022, 11 pages.

(Continued)

*Primary Examiner* — Awat M Salih
(74) *Attorney, Agent, or Firm* — Dority & Manning, P.A.

(57) ABSTRACT

An antenna system according to an example embodiment of the present disclosure can include a first substrate that can include an antenna array that can have a plurality of antenna elements. The antenna system can further include a second substrate that can be spaced apart from the first substrate and can include a radio frequency circuit that can be operable to carry a radio frequency signal to communicate via the antenna array. The first substrate can have a curved configuration relative to the second substrate such that at least one of the plurality of antenna elements can be disposed on a curved surface of the first substrate.

18 Claims, 13 Drawing Sheets

(56) References Cited

U.S. PATENT DOCUMENTS

| | | | | |
|---|---|---|---|---|
| 2018/0212325 | A1* | 7/2018 | Zhang | H01Q 21/205 |
| 2019/0191597 | A1 | 6/2019 | Han et al. | |
| 2019/0229790 | A1 | 7/2019 | Kosaka | |
| 2020/0021015 | A1* | 1/2020 | Yun | H01Q 1/2283 |
| 2020/0052367 | A1 | 2/2020 | Zhu et al. | |
| 2020/0303834 | A1* | 9/2020 | Suzuki | H04B 7/10 |
| 2020/0335847 | A1* | 10/2020 | Säily | H01Q 21/205 |
| 2020/0358186 | A1 | 11/2020 | Tran et al. | |

OTHER PUBLICATIONS

EP Application No. 22856599.0, extended European Search Report, mailed Apr. 24, 2025, 13 pages.

* cited by examiner

ANTENNA ARRAY ON CURVED AND FLAT SUBSTRATES

PRIORITY CLAIM

The present application is based on and claims priority to U.S. Provisional Patent Application No. 63/232,837, having a filing date of Aug. 13, 2021, which is incorporated by reference herein.

FIELD

The present disclosure relates generally to antenna systems used in wireless communication systems, such as an antenna system used in cellular communication systems.

BACKGROUND

Antenna systems, such as patch array antenna systems, can be coupled to various types of electronic devices (e.g., laptop, tablet, smartphone, IoT (Internet of Thing) device, etc.) to facilitate communication over cellular networks. Cellular networks operating in accordance with the fourth generation (4G) technology standard for broadband cellular networks are in abundant use and have recently evolved to provide moderate to high data-rate transmissions along with voice communications in a stable and reliable network over large regions. Communication systems are transitioning to the fifth generation (5G) technology standard for broadband cellular networks.

5G networks can provide substantially higher data-rates and lower latency, and can be applicable for voice, data, and IoT applications. 5G communication protocols can be implemented, for instance, using antenna arrays that are configured to facilitate multiple input multiple output (MIMO) communication and/or communication at higher frequency bands (e.g., a frequency band in the range of about 24 gigahertz (GHz) to about 86 GHz). Each of these antenna arrays can include a plurality of antenna elements (e.g., radiating elements). The antenna elements can be individually and/or collectively controlled by one or more control devices of a communication and/or antenna system to communicate signals (e.g., radio frequency (RF) signals) in a MIMO mode (e.g., a 4×4 MIMO mode). This can provide for higher data-rates and lower latency in wireless communications.

SUMMARY

Aspects and advantages of embodiments of the present disclosure will be set forth in part in the following description, or may be learned from the description, or may be learned through practice of the embodiments.

An antenna system according to an example embodiment of the present disclosure can include a first substrate that can include an antenna array that can have a plurality of antenna elements. The antenna system can further include a second substrate that can be spaced apart from the first substrate and can include a radio frequency circuit that can be operable to carry a radio frequency signal to communicate via the antenna array. The first substrate can have a curved configuration relative to the second substrate such that at least one of the plurality of antenna elements can be disposed on a curved surface of the first substrate.

A method of manufacturing an antenna system according to an example embodiment of the present disclosure can include forming, on a first substrate, an antenna array that can have a plurality of antenna elements. The method can further include forming, on a second substrate, a radio frequency circuit that can be operable to carry a radio frequency signal to communicate via the antenna array. The first substrate can be spaced apart from the second substrate and can have a curved configuration relative to the second substrate such that at least one of the plurality of antenna elements can be formed on a curved surface of the first substrate.

A method of configuring an antenna system according to an example embodiment of the present disclosure can include communicating, by one or more processors, a radio frequency signal using an antenna array. The antenna array can include a plurality of antenna elements disposed on a first substrate that can have a curved configuration relative to a second substrate that can be spaced apart from the first substrate. The second substrate can include a radio frequency circuit that can be operable to carry the radio frequency signal to communicate via the antenna array. The method can further include adjusting, by the one or more processors, a main lobe of a radiation pattern associated with the antenna array from pointing in a first direction to a second direction. The at least one of the plurality of antenna elements can be disposed on a curved surface of the first substrate.

These and other features, aspects, and advantages of various embodiments of the present disclosure will become better understood with reference to the following description and appended claims. The accompanying drawings, which are incorporated in and constitute a part of this specification, illustrate embodiments of the present disclosure and, together with the description, serve to explain the related principles of the present disclosure.

BRIEF DESCRIPTION OF THE DRAWINGS

Detailed descriptions of embodiments directed to one of ordinary skill in the art are set forth in the specification, which makes reference to the appended figures, in which.

Figure 1:
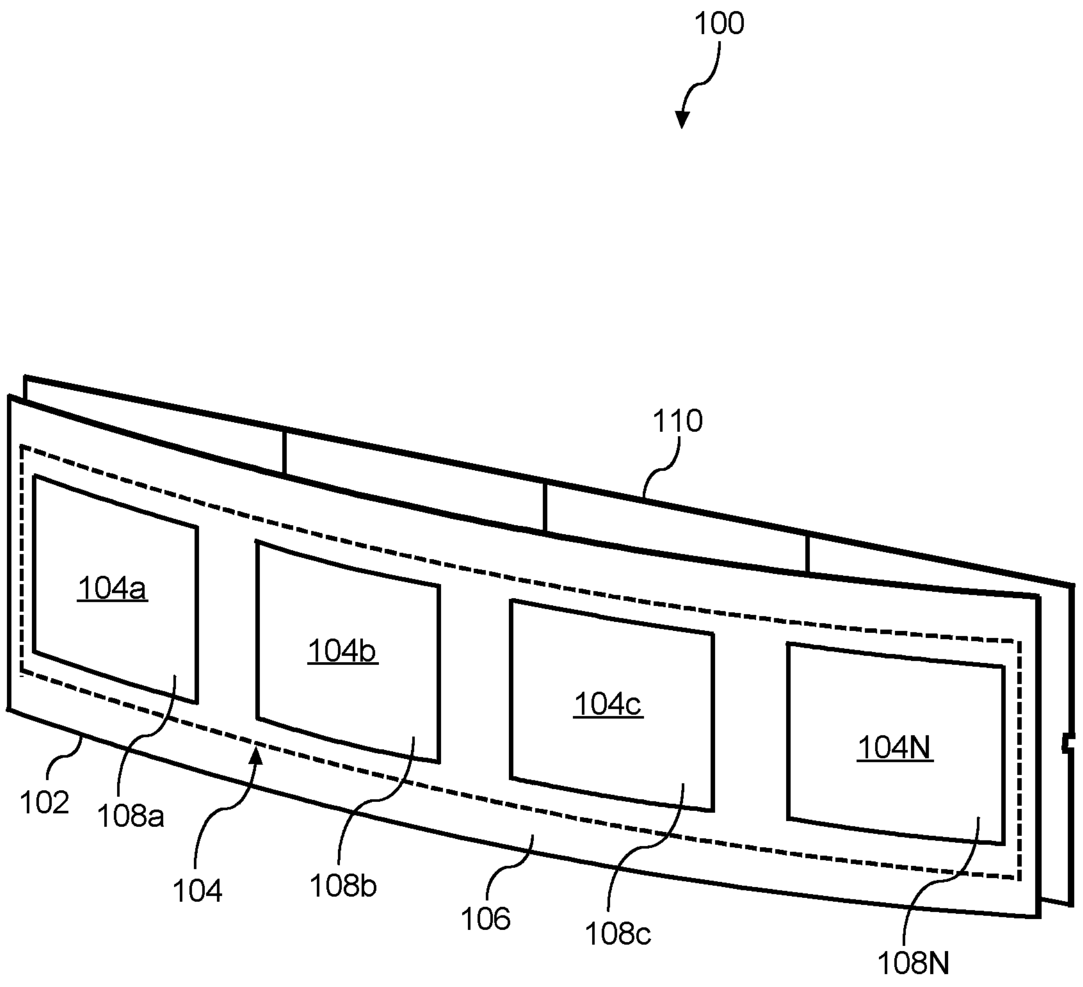
FIG. 1 illustrates a perspective view of an example, non-limiting antenna system that can facilitate approximately equal gain in any direction relative to an antenna array in accordance with one or more example embodiments of the present disclosure.

Repeat use of reference characters in the present specification and accompanying drawings is intended to represent the same or analogous features or elements of the present disclosure.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Unless otherwise specified, as used herein, terms of approximation, such as "approximately," "substantially," and/or "about," refer to being within a 10 percent (%) margin of error of the stated value. As referred to herein, the term "generally perpendicular" refers to being within about 10 degrees (°) of perpendicular. As referenced herein, the terms "or" and "and/or" are generally intended to be inclusive (that is (i.e.), "A or B" or "A and/or B" are each intended to mean "A or B or both"). As referred to herein, the terms "first," "second," "third," etc. can be used interchangeably to distinguish one component from another and are not intended to signify location or importance of the individual components.

As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling. As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims.

Example aspects of the present disclosure are directed to antenna systems. Existing antenna array systems, such as patch array antenna systems, that can be used in 5G networks and/or can implement 5G communication protocols generally include an antenna array of antenna elements (e.g., a patch antenna array of radiating elements) disposed on a first flat substrate and a RF circuit disposed on a second flat substrate that is coupled to the first flat substrate. The RF circuit is operable to carry an RF signal to communicate via the antenna elements. Such patch array antenna systems generally also include and/or are coupled to one or more control devices that can be operable to implement a beam forming operation using some or all of the antenna elements to adjust a radiation pattern associated with the antenna array such that a main lobe of the radiation pattern is adjusted from pointing in a one direction to another direction. Beam forming refers to the combination of different antenna beams to increase the signal strength in a particular direction (e.g., the direction of a base station) to enhance communication links.

A problem with such existing patch array antenna systems is that it is difficult to maintain generally equal gain values in one or more directions during such a beam forming operation. For example, when performing a beam forming operation using existing patch array antenna systems that have the antenna elements (e.g., a patch antenna array having radiating elements) disposed on a flat substrate as described above, it is difficult to maintain generally equal gain values, without changing the input power, in a Y-direction (e.g., along a Y-axis) while steering the main lobe in an azimuth direction. That is, for instance, such a flat substrate having the antenna elements disposed thereon does not allow for compensation of lower gain values associated with adjacent antenna elements to provide generally equal gain in all directions.

According to various example embodiments of the present disclosure, an antenna system, such as a patch array antenna system, can include a first substrate that can include a patch antenna array having a plurality of patch antennas. In these embodiments, the antenna system can further include a second substrate spaced apart from the first substrate and having an RF circuit operable to carry an RF signal to communicate via the patch antenna array. In such embodiments, the first substrate can have a curved configuration relative to the second substrate such that at least one of the plurality of antenna elements is disposed on a curved surface of the first substrate (e.g., disposed on a curved surface of a section of the first substrate having the curved configuration).

For instance, according to one example embodiment of the present disclosure, the curved configuration of the first substrate can be formed as a convex configuration relative to the second substrate, where the second substrate can have a generally flat configuration. In this example embodiment, the first substrate can have an end portion and a center portion, where a first distance between the end portion and a surface of the second substrate is less than a second distance between the center portion and the surface of the second substrate. In other example embodiments, the first substrate can be formed such that the curved configuration can include one or more convex curve configurations and/or one or more concave curve configurations. In some example embodiments of the present disclosure, one or more of the plurality of patch antennas can be formed on the first substrate using a laser direct structuring (LDS) process to provide for formation of at least one of such patch antennas on a curved surface of the first substrate (e.g., on a curved surface of a section of the first substrate having the curved configuration).

In some embodiments, the patch array antenna system according to example embodiments of the present disclosure can include and/or be coupled to one or more control devices that can be operable to implement a beam forming operation using some or all of the patch antennas to adjust a radiation pattern of the antenna array such that a main lobe of the radiation pattern is adjusted from pointing in a first direction to a second direction. As referenced herein, the "main lobe" refers to the lobe of the radiation pattern associated with the highest gain. For example, in the above embodiments, the main lobe can be associated with a first gain in the first direction and a second gain in the second direction, where the second gain can be approximately equal to the first gain (e.g., within about 20% of the first gain). In these embodiments, the first direction can be in a generally perpendicular direction from a center point on the second substrate and the second direction can be in a direction about 45 degrees (°) from the center point on the second substrate.

To facilitate the above-described beam forming operation, the patch array antenna system according to various example embodiments of the present disclosure can further include an RF feed circuit disposed on a first side of the second substrate and a ground plane disposed on a second side of the second substrate, where the second side can be opposite the first side. In these embodiments, the ground plane can have one or more slots and the RF feed circuit can be operable to couple the RF signal to one or more of the plurality of patch antennas via the one or more slots. In an example embodiment, at least one first slot of the one or more slots can extend in a first direction and at least one second slot of the one or more slots can extend in a second direction, where the first direction is generally perpendicular to the second direction. In this example, the RF feed circuit can couple the RF signal to the one or more slots, which can propagate the RF signal to excite one or more of the patch antennas, which can then communicate the RF signal. In some embodiments, one or more of the patch antennas can be used to communicate one or more RF signals and/or to support communication of the one or more RF signals via the patch antenna array and a cellular communication protocol (e.g., a 5G protocol) in a MIMO mode and/or a diversity mode in a frequency band range of about 24 GHz to about 86 GHz.

Aspects of the present disclosure provide numerous technical effects and benefits. For example, the antenna system according to example embodiments of the present disclosure can be used to increase gain of an antenna array (e.g., a patch antenna array) in one or more directions relative to the antenna array (e.g., a surface of the antenna array) such that the antenna array can provide approximately equal gain in any direction. In some embodiments, the antenna system can be implemented in one or more components of a cellular network to provide approximately equal gain in any direction relative to an antenna array during a beam forming operation. For instance, in one example embodiment, the antenna system can be implemented in one or more components of a 5G network, such as a 5G base station, to provide approximately equal gain in any direction relative to an antenna array during a beam forming operation. In this example, such implementation of the antenna system in a 5G network can increase signal strength and/or speed of an RF signal to provide higher data-rates and/or lower latency across the 5G network. In this example, such increased data-rates and/or lower latency across the 5G network can facilitate improved performance and/or lower operation costs associated with one or more communication and/or computing components of the 5G network (e.g., mobile devices, processors, servers, memory devices, etc.).

In additional or alternative example embodiments, as one or more of the plurality of antenna elements (e.g., radiating elements) can be formed on the above-described first substrate using an LDS process, the antenna system according to various example embodiments of the present disclosure can further provide for a simplified fabrication process of an antenna system that can provide approximately equal gain in any direction projecting from the antenna array during a beam forming operation. In these embodiments, such a simplified fabrication process can reduce costs associated with manufacturing and/or implementing the antenna system in a cellular network (e.g., a 5G network) and/or according to a cellular protocol (e.g., a 5G protocol).

FIG. 1 illustrates a perspective view of an example, non-limiting embodiment of an antenna system 100 that can facilitate approximately equal gain in any direction relative to an antenna array in accordance with one or more example embodiments of the present disclosure. As illustrated in the example embodiment depicted in FIG. 1, antenna system 100 can include a first substrate 102 that can have an antenna array 104 that can be disposed on a surface 106 (e.g., a top surface) of first substrate 102. In this example embodiment, antenna array 104 can include a plurality of antenna elements 104*a*, 104*b*, 104*c*, 104N (where "104N" refers to a total quantity of antenna elements). In this example embodiment, antenna elements 104*a*, 104*b*, 104*c*, 104N can respectively have surfaces 108*a*, 108*b*, 108*c*, 108N (where "108N" refers to a total quantity of surfaces). In some embodiments, first substrate 102 can be formed using, for instance, an insulating substrate. For example, in some embodiments, first substrate 102 can be formed using a glass-reinforced epoxy laminate material, such as fire retardant-4 (FR-4) material.

Although a single antenna array 104 is depicted in FIG. 1 as being disposed on surface 106 of first substrate 102 and as having four antenna elements 104*a*, 104*b*, 104*c*, 104N, it should be appreciated that the present disclosure is not so limiting. For example, those of ordinary skill in the art, using the disclosures provided herein, will understand that one or more additional antenna arrays 104 can be disposed on surface 106 of first substrate 102, where such one or more additional antenna arrays 104 can each have more or fewer antenna elements 104*a*, 104*b*, 104*c*, 104N without deviating from the scope of the present disclosure.

In the example embodiment depicted in FIG. 1, antenna system 100 can further include a second substrate 110 that can be spaced apart from first substrate 102. In this example embodiment, second substrate 110 can be coupled to first substrate 102 (e.g., communicatively coupled, electrically coupled, electromagnetically coupled, operatively coupled, etc.). Although not illustrated in FIG. 1, in some embodiments, second substrate 110 can include an RF circuit that can be operable to carry an RF signal to communicate via antenna array 104. For example, as described below and illustrated in FIG. 3, in some embodiments, second substrate 110 can include an RF feed circuit (not illustrated in the figures) and/or a ground plane formed thereon, where the ground plane can have one or more slots and the RF feed circuit can be operable to couple an RF signal to one or more of antenna elements 104*a*, 104*b*, 104*c*, 104N via the one or more slots. In this example, based at least in part on such coupling of the RF signal to one or more of antenna elements 104*a*, 104*b*, 104*c*, 104N, antenna array 104 and/or one or more of antenna elements 104*a*, 104*b*, 104*c*, 104N can communicate the RF signal. In some embodiments, second substrate 110 can be formed using, for instance, an insulating substrate. For example, in some embodiments, second substrate 110 can be formed using a glass-reinforced epoxy laminate material, such as FR-4 material.

According to various example embodiments of the present disclosure, first substrate 102 can be formed as and/or include a curved configuration relative to second substrate 110 such that at least one of antenna elements 104*a*, 104*b*, 104*c*, 104N is disposed on a curved surface of first substrate 102 (e.g., a curved surface of at least one section of first substrate 102). In some embodiments, at least one of antenna elements 104*a*, 104*b*, 104*c*, 104N can be formed on and/or integrated into such a curved surface of first substrate 102 such that at least one corresponding surface of surface 108*a*, 108*b*, 108*c*, and/or 108N has the same curved configuration as that of the curved surface of first substrate 102. For example, as illustrated in the example embodiment depicted in FIG. 1, one or more (e.g., all) of antenna elements 104*a*, 104*b*, 104*c*, 104N can be formed on surface 106 of first substrate 102, where surface 106 can be a convex curved surface relative to second substrate 110. In this example embodiment, one or more (e.g., all) of surfaces 108*a*, 108*b*, 108*c*, 108N can have the same convex curved configuration as that of surface 106. In some embodiments, one or more of surfaces 108*a*, 108*b*, 108*c*, 108N can have the same curved configuration as that of surface 106 (e.g., convex, concave, etc.) and be approximately coplanar to surface 106. In some embodiments, one or more of surfaces 108*a*, 108*b*, 108*c*, 108N can have the same curved configuration as that of surface 106 (e.g., convex, concave, etc.) and can be formed on first substrate 102 so as to be disposed in a plane adjacent to surface 106 (e.g., a parallel or approximately parallel plane adjacent to surface 106).

Although first substrate 102 is depicted in the example embodiment illustrated in FIG. 1 as having a single convex curve configuration and surface (e.g., surface 106) relative to second substrate 110, it should be appreciated that the present disclosure is not so limiting. For example, those of ordinary skill in the art, using the disclosures provided herein, will understand that, in some embodiments, first substrate 102 can be formed as and/or include one or more convex curve configurations and/or surfaces, one or more concave curve configurations and/or surfaces, one or more biconcave curve configurations and/or surfaces, and/or one or more concavo-convex curve configurations and/or surfaces relative to second substrate 110, without deviating from the scope of the present disclosure.

In some embodiments, one or more of antenna elements 104*a*, 104*b*, 104*c*, 104N (e.g., a plurality of antenna elements 104*a*, 104*b*, 104*c*, 104N) can constitute and/or be provided as laser direct structuring (LDS) defined antenna elements. In these embodiments, one or more of antenna elements 104*a*, 104*b*, 104*c*, 104N (e.g., a plurality of antenna elements 104*a*, 104*b*, 104*c*, 104N) can be formed on first substrate 102 using an LDS process such that at least one of antenna elements 104*a*, 104*b*, 104*c*, 104N is disposed on a curved surface (e.g., surface 106) of first substrate 102.

In some embodiments, antenna system 100 can be provided as a patch array antenna system, where antenna array 104 can be provided as a patch antenna array. In these embodiments, antenna elements 104*a*, 104*b*, 104*c*, 104N can be provided as radiating elements of such a patch antenna array that can be operable to communicate an RF signal (e.g., transmit and/or receive an RF signal).

Although not depicted in the example embodiment illustrated in FIG. 1, in some embodiments, antenna system 100 can further include and/or be coupled to a control circuit having one or more control devices that can be operable to configure one or more antenna elements 104*a*, 104*b*, 104*c*, 104N to: communicate one or more signals (e.g., one or more RF signals); support communication of such one or more signals; and/or to perform a beam forming operation. An example, non-limiting embodiment of such a control circuit having such one or more control devices is described below and illustrated in FIG. 11 as control circuit 1100.

In example embodiments of the present disclosure, control circuit 1100 and/or one or more control devices thereof can be used to implement a beam forming operation. For example, in these embodiments, antenna system 100 can further include and/or be coupled to control circuit 1100 (FIG. 11) and/or one or more control devices thereof that can be operable to implement a beam forming operation to adjust a radiation pattern of antenna array 104 such that a main lobe of the radiation pattern is adjusted from pointing in a first direction to a second direction. In these example embodiments, the main lobe can be associated with a first gain in the first direction and a second gain in the second direction, where the second gain can be approximately equal to the first gain (e.g., within about 20% of the first gain). In these example embodiments, the first direction can be in a generally perpendicular direction from a center point on second substrate 110 and the second direction can be in a direction about 45° from the center point on second substrate 110 or another direction.

To implement such a beam forming operation described in the above example embodiments, control circuit 1100 and/or one or more control devices thereof can be used according to various embodiments of the present disclosure to adjust the power and/or phase of one or more signals (e.g., one or more RF signals) that can be communicated to one or more of antenna elements 104*a*, 104*b*, 104*c*, 104N. In some embodiments, control circuit 1100 and/or one or more control devices thereof can be used to implement a phase shift in such one or more signals using delay lines that introduce a time delay in the signal(s) communicated using the delay line. In other embodiments, control circuit 1100 and/or one or more control devices thereof can be used to implement a phase shift in such one or more signals using a phase shifter.

According to various example embodiments of the present disclosure, antenna system 100 depicted in FIG. 1 can be implemented in one or more components of a cellular network to provide approximately equal gain in any direction relative to antenna array 104 during a beam forming operation. For instance, in one example embodiment, antenna system 100 can be implemented in one or more components of a 5G cellular communication network, such as a 5G base station, to provide approximately equal gain in any direction relative to antenna array 104 during a beam forming operation. For example, antenna system 100 can be implemented in such one or more components to provide approximately equal gain in one or more directions relative to surface 106 and/or surface 108 such that antenna array 104 and/or antenna elements 104*a*, 104*b*, 104*c*, and/or 104N can provide approximately equal gain in any direction relative to antenna array 104 during a beam forming operation.

In some embodiments, one or more (e.g., each) of antenna elements 104*a*, 104*b*, 104*c*, 104N can be operable to communicate one or more signals (e.g., one or more RF signals) and/or to support communication of the one or more signals via a cellular communication protocol, such as a 5G cellular communication protocol. In some embodiments, one or more (e.g., each) of antenna elements 104*a*, 104*b*, 104*c*, 104N can be operable to communicate and/or support communication of such one or more signals via a cellular communication in a MIMO mode (e.g., a 4×4 MIMO mode) or a diversity mode. In some embodiments, one or more (e.g., each) of antenna elements 104*a*, 104*b*, 104*c*, 104N can be operable to communicate and/or support communication of such one or more signals via a cellular communication in a MIMO mode or a diversity mode in a frequency band range of about 24 GHz to about 86 GHz.

Although the example embodiment of antenna system 100 illustrated in FIG. 1 depicts second substrate 110 as having a flat configuration relative to first substrate 102, it should be appreciated that example embodiments of the present disclosure are not so limiting. For example, second substrate 110 according to example embodiment(s) of the present disclosure can have a curved configuration. For instance, in such example embodiment(s), second substrate 110 can have the same or different curved configuration as that of first substrate 102 without deviating from the scope of the present disclosure.

Although the example embodiment of antenna system 100 illustrated in FIG. 1 depicts first substrate 102 as having a curved configuration relative to second substrate 110, where such a curved configuration can be curved with respect to a two-dimensional (2D) space, it should be appreciated that example embodiments of the present disclosure are not so limiting. For example, first substrate 102 and/or second substrate 110 according to example embodiment(s) of the present disclosure can be formed such that one or both of such substrates have a curved configuration in a three-dimensional (3D) space (e.g., a 3D configuration) without deviating from the scope of the present disclosure. For instance, in one example embodiment, first substrate 102 and/or second substrate 110 can be formed such that one or both substrates have a dome-shaped configuration.

Figure 2:
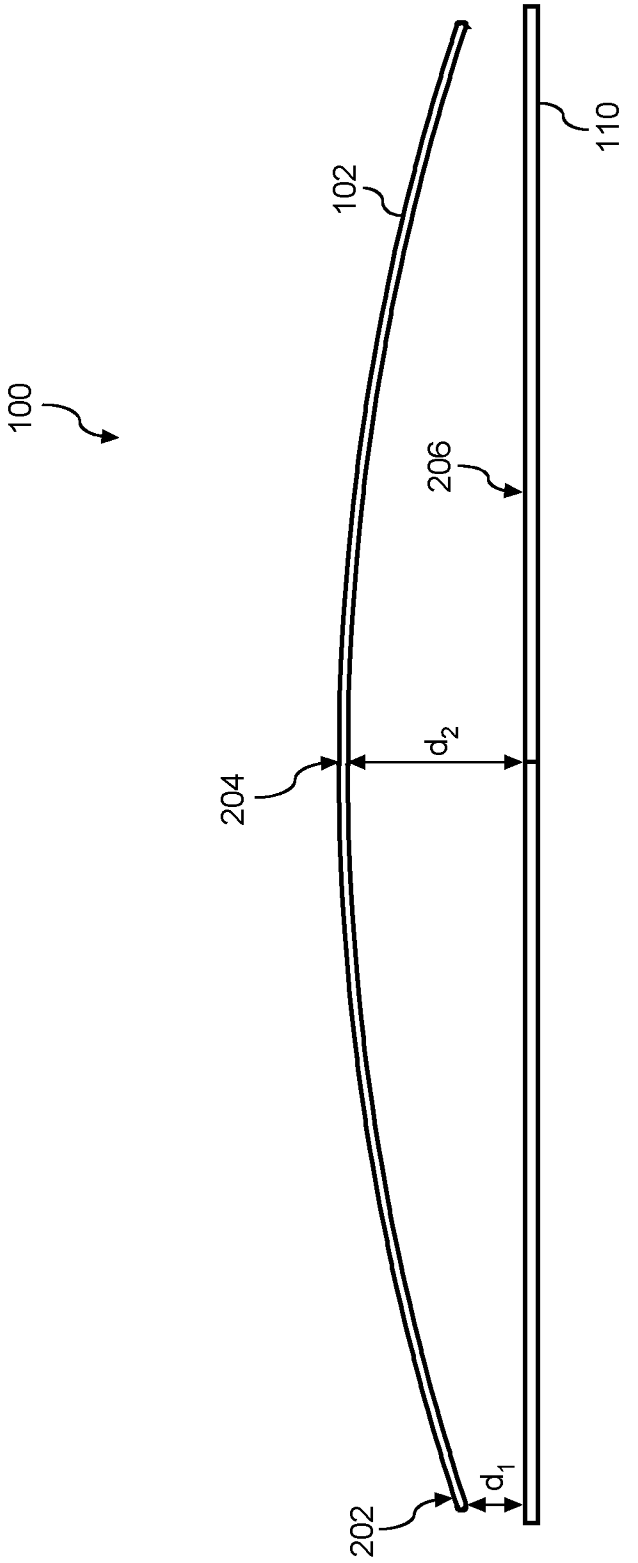
FIG. 2 illustrates a cross-sectional, side view of the example, non-limiting antenna system of FIG. 1.

FIG. 2 illustrates a cross-sectional, side view of the example, non-limiting antenna system 100 of FIG. 1. As illustrated in FIG. 2, in one example embodiment of the present disclosure, first substrate 102 can include an end portion 202 and a center portion 204. In this example embodiment, a first distance $d_1$ between end portion 202 and a surface 206 of second substrate 110 can be less than a second distance $d_2$ between center portion 204 and surface 206 of second substrate 110.

Although first substrate 102 is depicted in the example embodiments illustrated in FIGS. 1 and 2 as having a single convex curve configuration relative to second substrate 110, it should be appreciated that the present disclosure is not so limiting. For example, those of ordinary skill in the art, using the disclosures provided herein, will understand that, in some embodiments, first substrate 102 can be formed as and/or include one or more convex curve configurations and/or one or more concave curve configurations relative to second substrate 110, without deviating from the scope of the present disclosure. For instance, in some example embodiments of the present disclosure, first substrate 102 can be formed as and/or include one or more of the various curved configurations described below and illustrated in the example embodiments depicted in FIGS. 6, 7, 8, 9, and 10.

Although the example embodiment of antenna system 100 illustrated in FIG. 2 depicts second substrate 110 as having a flat configuration relative to first substrate 102, it should be appreciated that example embodiments of the present disclosure are not so limiting. For example, second substrate 110 according to example embodiment(s) of the present disclosure can have a curved configuration. For instance, in such example embodiment(s), second substrate 110 can have the same or different curved configuration as that of first substrate 102 without deviating from the scope of the present disclosure.

Although the example embodiment of antenna system 100 illustrated in FIG. 2 depicts first substrate 102 as having a curved configuration relative to second substrate 110, where such a curved configuration can be curved with respect to a 2D space, it should be appreciated that example embodiments of the present disclosure are not so limiting. For example, first substrate 102 and/or second substrate 110 according to example embodiment(s) of the present disclosure can be formed such that one or both of such substrates have a curved configuration in a 3D space (e.g., a 3D configuration) without deviating from the scope of the present disclosure. For instance, in one example embodiment, first substrate 102 and/or second substrate 110 can be formed such that one or both substrates have a dome-shaped configuration.

Figure 3:
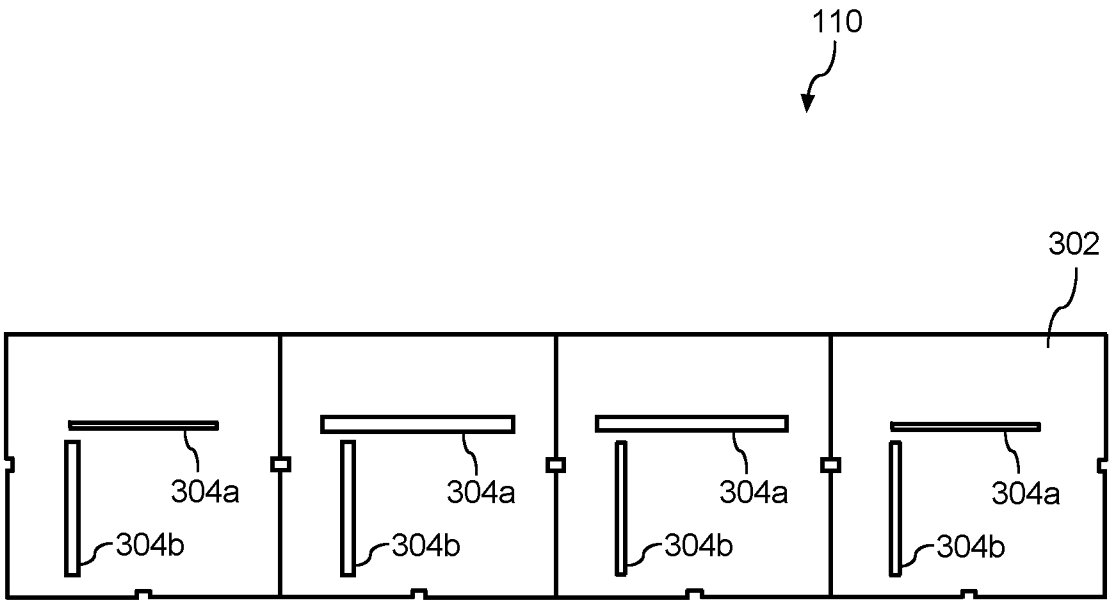
FIG. 3 illustrates a top view of an example, non-limiting substrate of the example, non-limiting antenna system of FIG. 1.

FIG. 3 illustrates a top view of second substrate 110 of the example, non-limiting antenna system 100 described above and depicted in FIG. 1. In accordance with various example embodiments of the present disclosure, second substrate 110 can include a radio frequency (RF) feed circuit (not illustrated in FIG. 3) and/or a ground plane 302 disposed thereon. In these example embodiments, the RF feed circuit can be disposed on a first side of second substrate 110 (e.g., a bottom side, not illustrated in FIG. 3) and ground plane 302 can be disposed on a second side of second substrate 110 (e.g., a top side), where the second side can be opposite the first side. In these example embodiments, ground plane 302 can include one or more slots **304*a*, 304*b* and the RF feed circuit can be operable to couple (e.g., via control circuit 1100) an RF signal to one or more of antenna elements 104*a*, 104*b*, 104*c*, 104N via one or more slots 304*a*, 304*b*. In these example embodiments, as illustrated in FIG. 3, at least one first slot of one or more slots 304*a* can extend in a first direction (e.g., horizontally across FIG. 3) and at least one second slot of one or more slots 304*b* can extend in a second direction (e.g., vertically across FIG. 3**), where the first direction can be generally perpendicular to the second direction.

Figure 4:
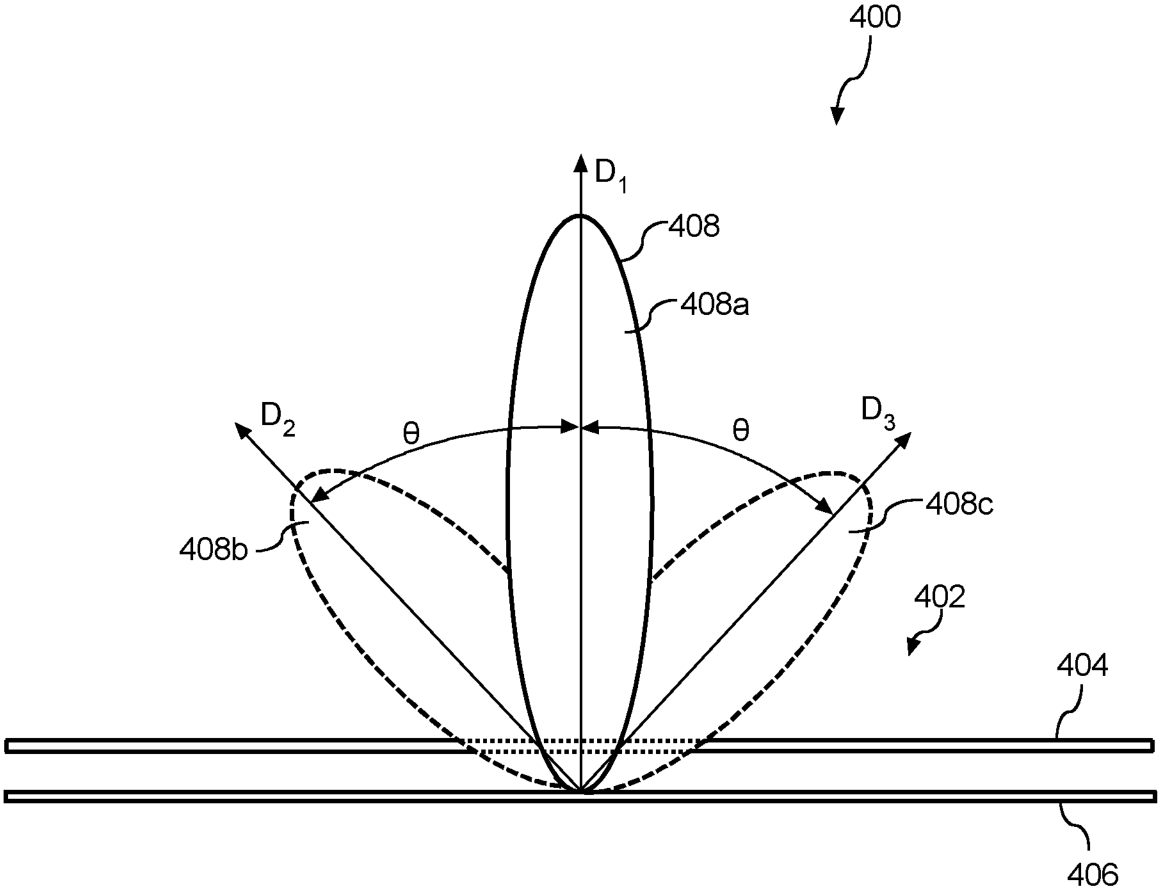
FIG. 4 illustrates a schematic diagram of an example radiation pattern that can be obtained by implementing an antenna system having flat, parallel substrates.

FIG. 4 illustrates a schematic diagram of an example radiation pattern 400 that can be obtained by implementing an antenna system having flat, parallel substrates. For example, radiation pattern 400 can be obtained by using an antenna system 402 depicted in FIG. 4 to implement a beam forming operation. Antenna system 402 depicted in FIG. 4 includes a first flat substrate 404 spaced apart from and/or coupled to a second flat substrate 406. First flat substrate 404 includes an antenna array (not illustrated in FIG. 4), such as a patch antenna array, having a plurality of antenna elements (e.g., radiating elements of a patch antenna array, not illustrated in FIG. 4). Second flat substrate 406 includes an RF circuit (not illustrated in FIG. 4) operable to carry an RF signal to communicate via the antenna array. The RF circuit includes an RF feed circuit and a ground plane having one or more slots, where the RF feed circuit is operable to couple the RF signal to the plurality of antenna elements via the one or more slots.

When performing a beam forming operation using antenna system 402, a main lobe 408 of radiation pattern 400 is adjusted from pointing in a first direction $D_1$ to a second direction $D_2$, and/or to a third direction $D_3$. First direction $D_1$ can be in a generally perpendicular direction from a center point on second flat substrate 406 and second direction $D_2$ and/or third direction $D_3$ can be in a direction defined by an angle θ from the center point on second flat substrate 406, where such an angle θ can be about 45° or another suitable angle. In radiation pattern 400, main lobe 408 is associated with a first gain **408*a* in first direction $D_1$, a second gain 408*b* in second direction $D_2$, and/or a third gain 408*c* in third direction $D_3$. As illustrated by radiation pattern 400 in FIG. 4, second gain 408*b* in second direction $D_2$ and third gain 408*c* in third direction $D_3$ are substantially less relative to first gain 408*a*** in first direction $D_1$. To overcome such deficiencies, one or more antenna systems and/or methods are described herein with reference to the accompanying figures to provide improved gain equality in any direction relative to an antenna array.

Figure 5:
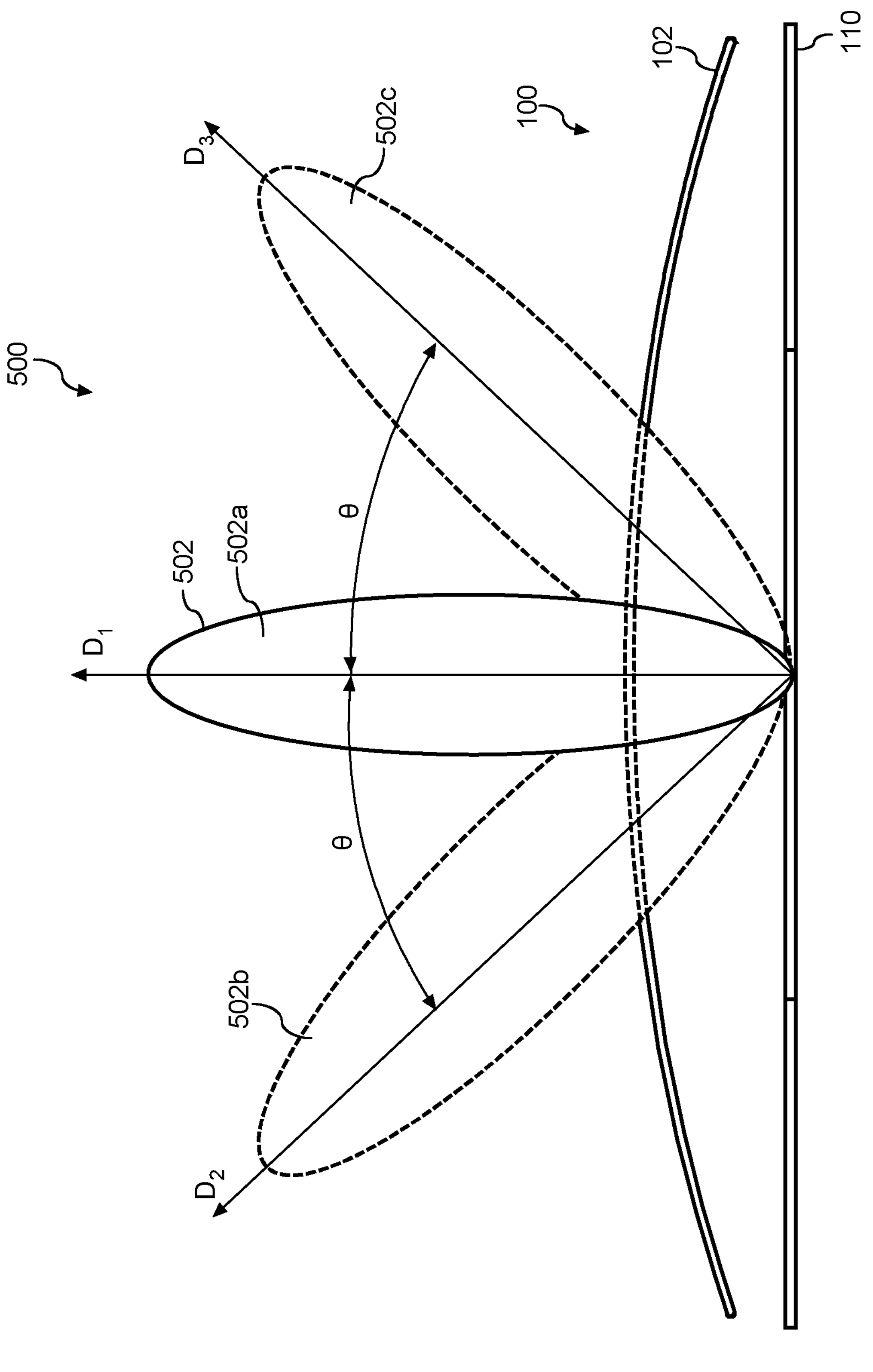
FIG. 5 illustrates a schematic diagram of an example, non-limiting radiation pattern that can be obtained by implementing one or more example embodiments of the present disclosure.

FIG. 5 illustrates a schematic diagram of an example, non-limiting radiation pattern 500 that can be obtained by implementing one or more example embodiments of the present disclosure. For example, radiation pattern 500 can be obtained by using one or more antenna systems described herein, such as antenna system 100, to implement a beam forming operation in accordance with one or more example embodiments of the present disclosure (e.g., via control circuit 1100 as described below with reference to FIG. 11).

When performing a beam forming operation (e.g., via control circuit 1100) using, for example, antenna system 100 in accordance with one or more example embodiments described herein, a main lobe 502 of radiation pattern 500 can be adjusted from pointing in a first direction $D_1$ to a second direction $D_2$, and/or to a third direction $D_3$. In the example embodiment depicted in FIG. 5, first direction $D_1$ can be in a generally perpendicular direction from a center point on second substrate 110 and second direction $D_2$ and/or third direction $D_3$ can be in a direction defined by an angle θ from the center point on second substrate 110, where such an angle θ can be about 45°. In the example embodiment depicted in FIG. 5, main lobe 502 can be associated with a first gain 502*a* in first direction $D_1$, a second gain 502*b* in second direction $D_2$, and/or a third gain 502*c* in third direction $D_3$. As illustrated by radiation pattern 500 in the example embodiment depicted in FIG. 5, second gain 502*b* in second direction $D_2$ and/or third gain 502*c* in third direction $D_3$ can be approximately equal to first gain 502*a* in first direction $D_1$. For example, as illustrated by radiation pattern 500 in the example embodiment depicted in FIG. 5, second gain 502*b* in second direction $D_2$ and/or third gain 502*c* in third direction $D_3$ can be approximately equal to first gain 502*a* in first direction $D_1$ (e.g., within about 20% of first gain 502*a* in first direction $D_1$).

Figure 6:
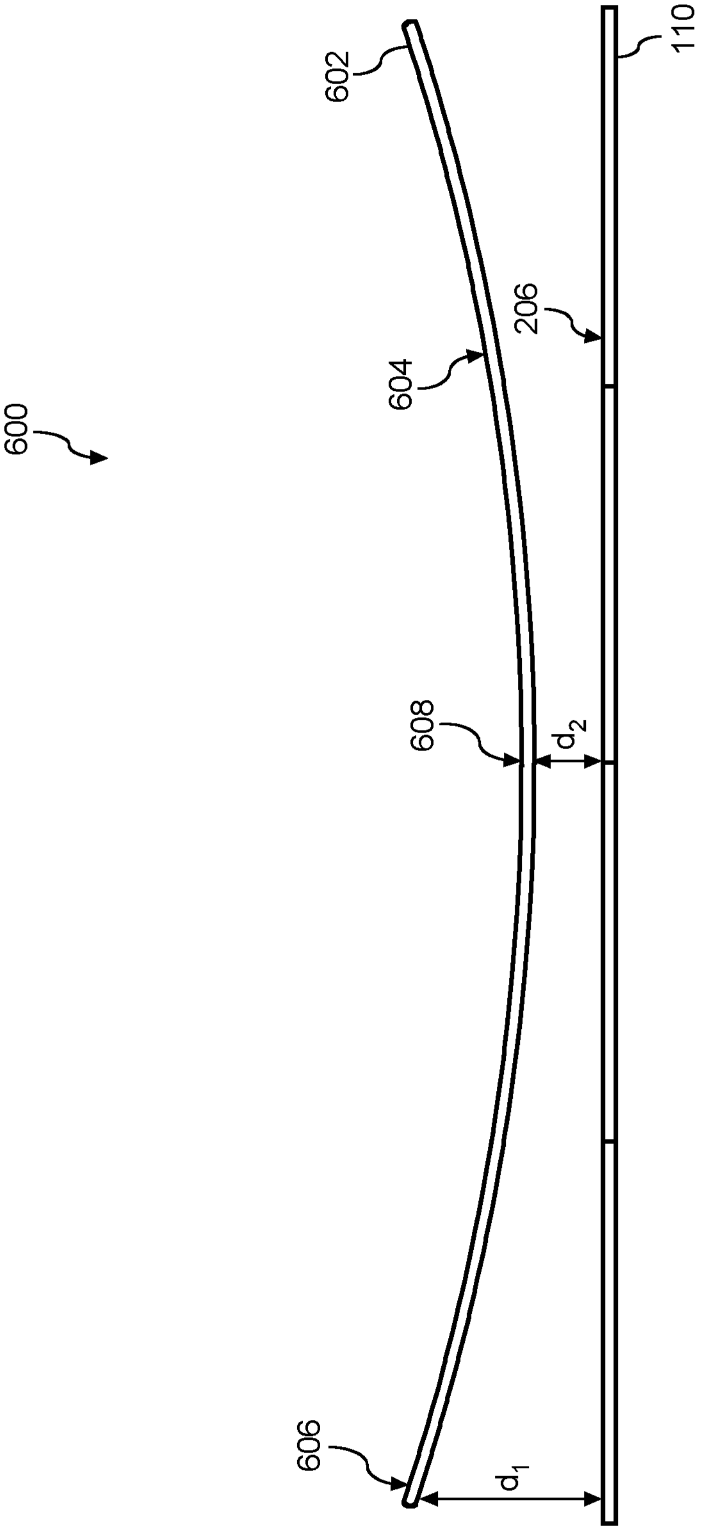
FIGS. 6, 7, 8, 9, and 10 each illustrate a cross-sectional, side view of an example, non-limiting antenna system in accordance with one or more example embodiments of the present disclosure.

FIG. 6 illustrates a cross-sectional, side view of an example, non-limiting antenna system 600 in accordance with one or more example embodiments of the present disclosure. According to one example embodiment of the present disclosure, antenna system 600 can constitute and/or be provided as an example, non-limiting alternative embodiment of antenna system 100 described above and illustrated in FIG. 1.

As illustrated in the example embodiment depicted in FIG. 6, antenna system 600 can include a first substrate 602 that can be formed as and/or include a single concave curve configuration relative to second substrate 110. In this example embodiment, first substrate 602 can be formed using the same material(s) as that of first substrate 102 described above with reference to FIG. 1 (e.g., FR-4). In this example embodiment, first substrate 602 can include and/or provide the same functionality as that of first substrate 102 described above with reference to FIG. 1.

With reference to the example embodiment described above and illustrated in FIG. 1, in the example embodiment depicted in FIG. 6, antenna array 104 (not illustrated in FIG. 6) and/or one or more of antenna elements 104*a*, 104*b*, 104*c*, 104N (not illustrated in FIG. 6) can be disposed on (e.g., formed on and/or integrated into) a surface 604 (e.g., a top surface) of first substrate 602 such that at least one of antenna elements 104*a*, 104*b*, 104*c*, 104N is disposed on a curved section of surface 604. In this example embodiment, surface 604 can be formed as and/or include the same concave curved configuration as that of first substrate 602, relative to second substrate 110. In this example embodiment, one or more of surfaces 108*a*, 108*b*, 108*c*, 108N (not illustrated in FIG. 6) respectively corresponding to one or more of antenna elements 104*a*, 104*b*, 104*c*, 104N, can have the same curved configuration as that of surface 604. For example, in some embodiments, one or more of surfaces 108*a*, 108*b*, 108*c*, 108N can have the same curved configuration as that of surface 604 and be approximately coplanar to surface 604. In some embodiments, one or more of surfaces 108*a*, 108*b*, 108*c*, 108N can have the same curved configuration as that of surface 604 and can be formed on first substrate 602 so as to be disposed in a plane adjacent to surface 604 (e.g., a parallel or approximately parallel plane adjacent to surface 604).

As illustrated in the example embodiment depicted in FIG. 6, first substrate 602 can include an end portion 606 and a center portion 608. In this example embodiment, a first distance $d_1$ between end portion 606 and surface 206 of second substrate 110 can be greater than a second distance $d_2$ between center portion 608 and surface 206 of second substrate 110.

Figure 7:
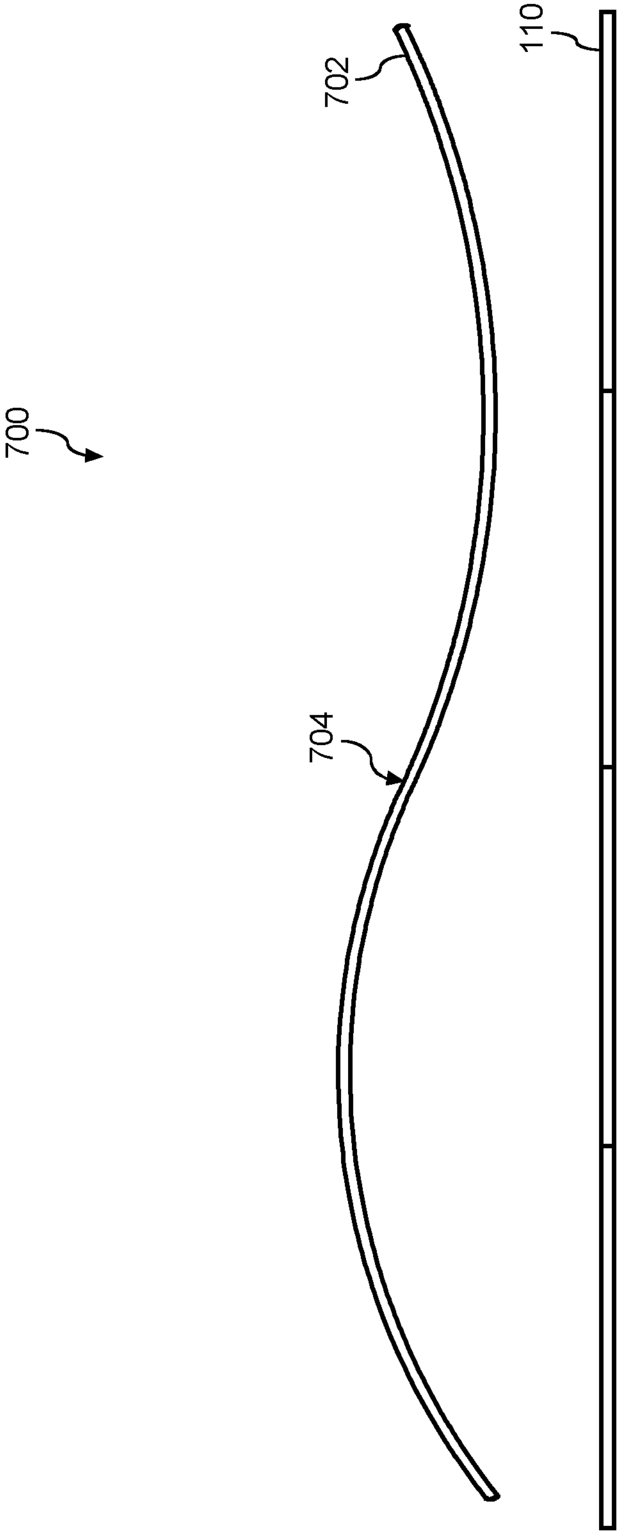

FIG. 7 illustrates a cross-sectional, side view of an example, non-limiting antenna system 700 in accordance with one or more example embodiments of the present disclosure. According to one example embodiment of the present disclosure, antenna system 700 can constitute and/or be provided as an example, non-limiting alternative embodiment of antenna system 100 described above and illustrated in FIG. 1.

As illustrated in the example embodiment depicted in FIG. 7, antenna system 700 can include a first substrate 702 that can be formed as and/or include a single convex and single concave curve configuration relative to second substrate 110. In this example embodiment, first substrate 702 can be formed using the same material(s) as that of first substrate 102 described above with reference to FIG. 1 (e.g., FR-4). In this example embodiment, first substrate 702 can include and/or provide the same functionality as that of first substrate 102 described above with reference to FIG. 1.

With reference to the example embodiment described above and illustrated in FIG. 1, in the example embodiment depicted in FIG. 7, antenna array 104 (not illustrated in FIG. 7) and/or one or more of antenna elements 104*a*, 104*b*, 104*c*, 104N (not illustrated in FIG. 7) can be disposed on (e.g., formed on and/or integrated into) a surface 704 (e.g., a top surface) of first substrate 702 such that at least one of antenna elements 104*a*, 104*b*, 104*c*, 104N is disposed on a curved section of surface 704. In this example embodiment, surface 704 can be formed as and/or include the same single convex and single concave curve configuration as that of first substrate 702, relative to second substrate 110. In this example embodiment, one or more of surfaces 108*a*, 108*b*, 108*c*, 108N (not illustrated in FIG. 7) respectively corresponding to one or more of antenna elements 104*a*, 104*b*, 104*c*, 104N, can have the same curve configuration as that of surface 704. For example, in some embodiments, one or more of surfaces 108*a*, 108*b*, 108*c*, 108N can have the same curve configuration as that of surface 704 and be approximately coplanar to surface 704. In some embodiments, one or more of surfaces 108*a*, 108*b*, 108*c*, 108N can have the same curve configuration as that of surface 704 and can be formed on first substrate 702 so as to be disposed in a plane adjacent to surface 704 (e.g., a parallel or approximately parallel plane adjacent to surface 704).

Figure 8:
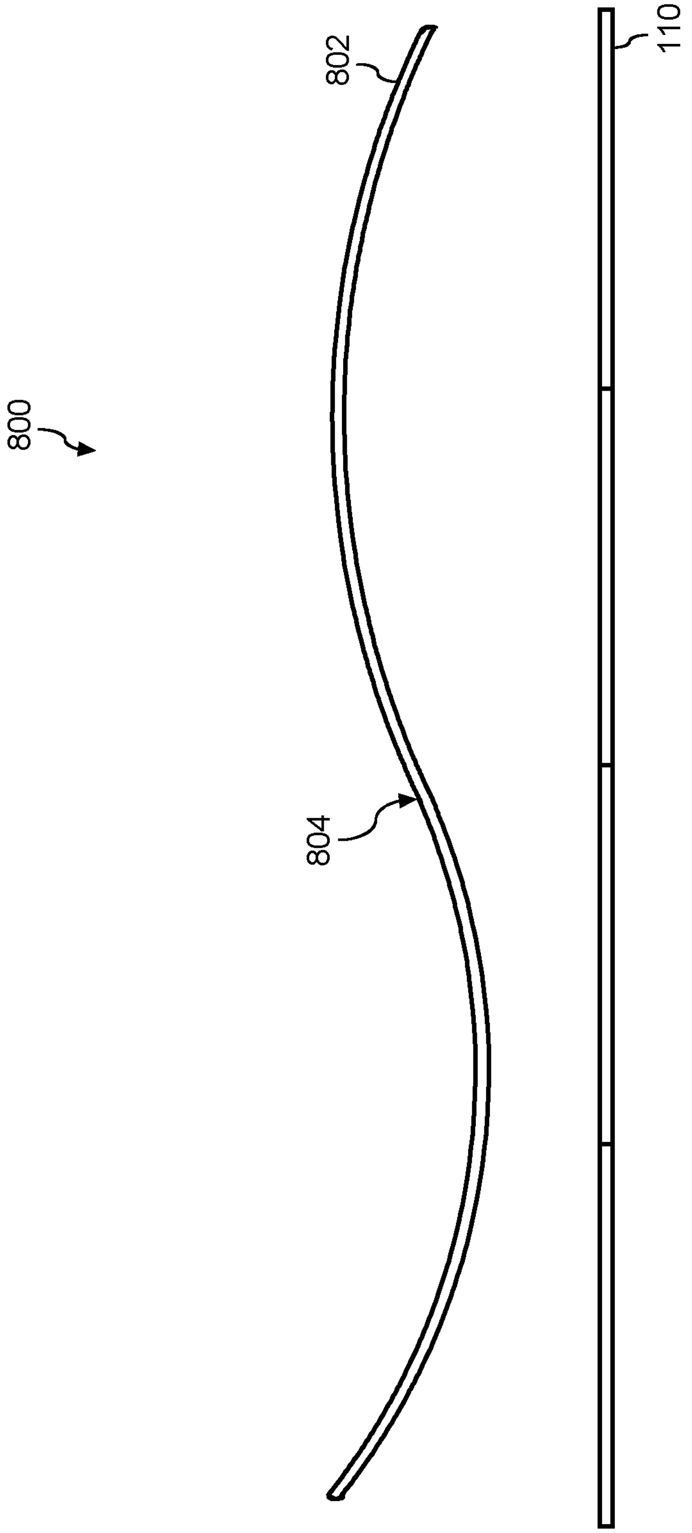

FIG. 8 illustrates a cross-sectional, side view of an example, non-limiting antenna system 800 in accordance with one or more example embodiments of the present disclosure. According to one example embodiment of the present disclosure, antenna system 800 can constitute and/or be provided as an example, non-limiting alternative embodiment of antenna system 100 described above and illustrated in FIG. 1.

As illustrated in the example embodiment depicted in FIG. 8, antenna system 800 can include a first substrate 802 that can be formed as and/or include a single concave and single convex curve configuration relative to second substrate 110. In this example embodiment, first substrate 802 can be formed using the same material(s) as that of first substrate 102 described above with reference to FIG. 1 (e.g., FR-4). In this example embodiment, first substrate 802 can include and/or provide the same functionality as that of first substrate 102 described above with reference to FIG. 1.

With reference to the example embodiment described above and illustrated in FIG. 1, in the example embodiment depicted in FIG. 8, antenna array 104 (not illustrated in FIG. 8) and/or one or more of antenna elements 104*a*, 104*b*, 104*c*, 104N (not illustrated in FIG. 8) can be disposed on (e.g., formed on and/or integrated into) a surface 804 (e.g., a top surface) of first substrate 802 such that at least one of antenna elements 104*a*, 104*b*, 104*c*, 104N is disposed on a curved section of surface 804. In this example embodiment, surface 804 can be formed as and/or include the same single concave and single convex curve configuration as that of first substrate 802, relative to second substrate 110. In this example embodiment, one or more of surfaces 108*a*, 108*b*, 108*c*, 108N (not illustrated in FIG. 8) respectively corresponding to one or more of antenna elements 104*a*, 104*b*, 104*c*, 104N, can have the same curve configuration as that of surface 804. For example, in some embodiments, one or more of surfaces 108*a*, 108*b*, 108*c*, 108N can have the same curve configuration as that of surface 804 and be approximately coplanar to surface 804. In some embodiments, one or more of surfaces 108*a*, 108*b*, 108*c*, 108N can have the same curve configuration as that of surface 804 and can be formed on first substrate 802 so as to be disposed in a plane adjacent to surface 804 (e.g., a parallel or approximately parallel plane adjacent to surface 804).

Figure 9:
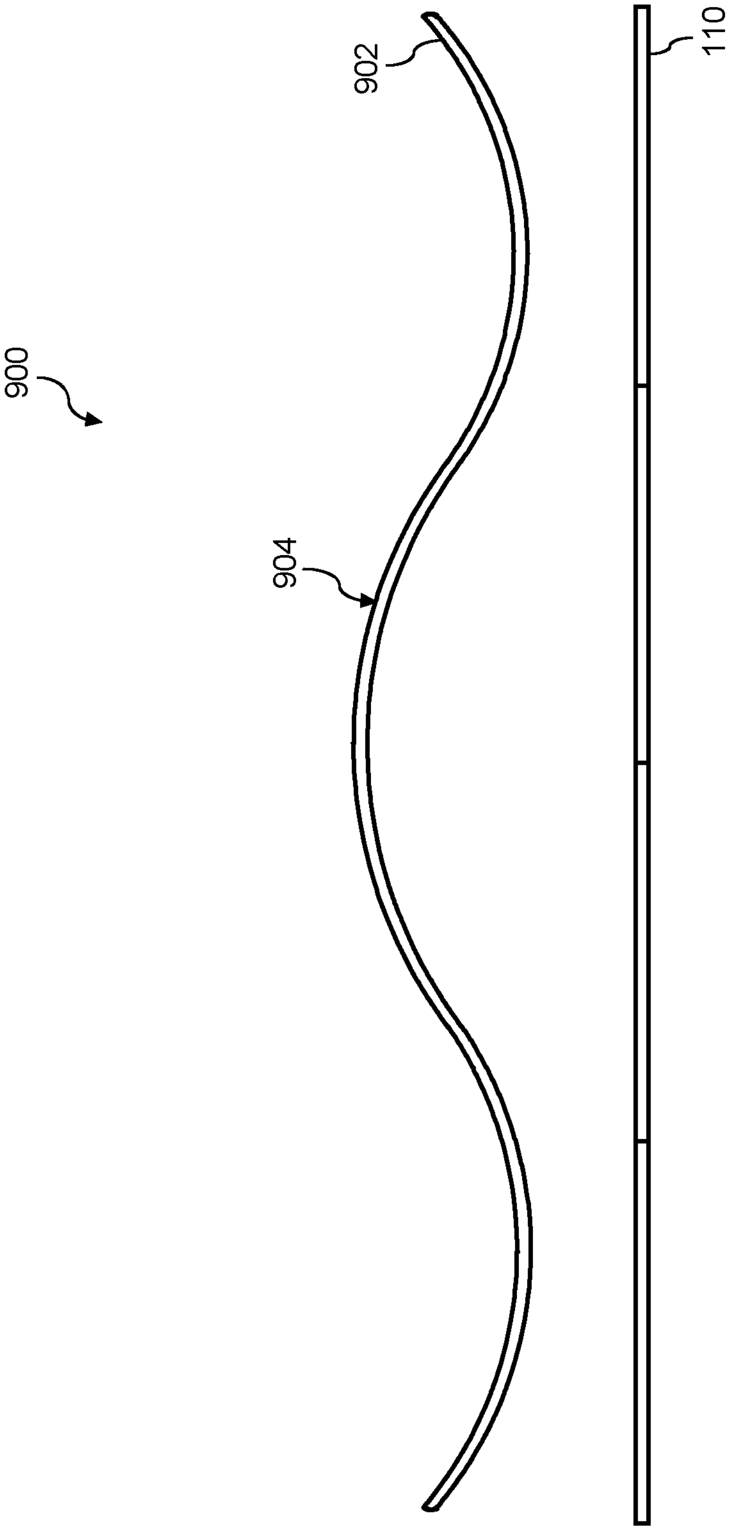

FIG. 9 illustrates a cross-sectional, side view of an example, non-limiting antenna system 900 in accordance with one or more example embodiments of the present disclosure. According to one example embodiment of the present disclosure, antenna system 900 can constitute and/or be provided as an example, non-limiting alternative embodiment of antenna system 100 described above and illustrated in FIG. 1.

As illustrated in the example embodiment depicted in FIG. 9, antenna system 900 can include a first substrate 902 that can be formed as and/or include a single convex and double concave curve configuration relative to second substrate 110. In this example embodiment, first substrate 902 can be formed using the same material(s) as that of first substrate 102 described above with reference to FIG. 1 (e.g., FR-4). In this example embodiment, first substrate 902 can include and/or provide the same functionality as that of first substrate 102 described above with reference to FIG. 1.

With reference to the example embodiment described above and illustrated in FIG. 1, in the example embodiment depicted in FIG. 9, antenna array 104 (not illustrated in FIG. 9) and/or one or more of antenna elements 104*a*, 104*b*, 104*c*, 104N (not illustrated in FIG. 9) can be disposed on (e.g., formed on and/or integrated into) a surface 904 (e.g., a top surface) of first substrate 902 such that at least one of antenna elements 104*a*, 104*b*, 104*c*, 104N is disposed on a curved section of surface 904. In this example embodiment, surface 904 can be formed as and/or include the same single convex and double concave curve configuration as that of first substrate 902, relative to second substrate 110. In this example embodiment, one or more of surfaces 108*a*, 108*b*, 108*c*, 108N (not illustrated in FIG. 9) respectively corresponding to one or more of antenna elements 104*a*, 104*b*, 104*c*, 104N, can have the same curve configuration as that of surface 904. For example, in some embodiments, one or more of surfaces 108*a*, 108*b*, 108*c*, 108N can have the same curve configuration as that of surface 904 and be approximately coplanar to surface 904. In some embodiments, one or more of surfaces 108*a*, 108*b*, 108*c*, 108N can have the same curve configuration as that of surface 904 and can be formed on first substrate 902 so as to be disposed in a plane adjacent to surface 904 (e.g., a parallel or approximately parallel plane adjacent to surface 904).

Figure 10:
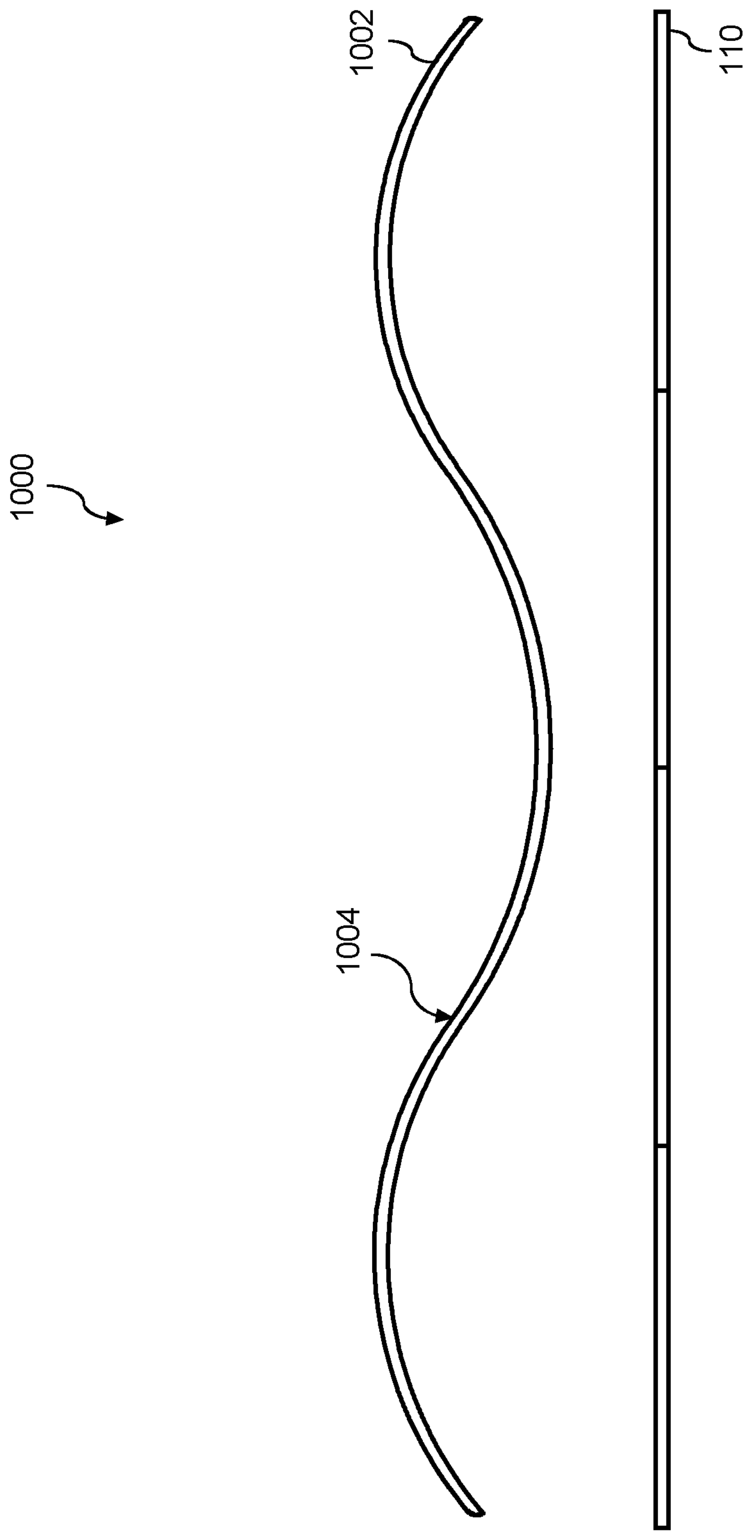

FIG. 10 illustrates a cross-sectional, side view of an example, non-limiting antenna system 1000 in accordance with one or more example embodiments of the present disclosure. According to one example embodiment of the present disclosure, antenna system 1000 can constitute and/or be provided as an example, non-limiting alternative embodiment of antenna system 100 described above and illustrated in FIG. 1.

As illustrated in the example embodiment depicted in FIG. 10, antenna system 1000 can include a first substrate 1002 that can be formed as and/or include a single concave and double convex curve configuration relative to second substrate 110. In this example embodiment, first substrate 1002 can be formed using the same material(s) as that of first substrate 102 described above with reference to FIG. 1 (e.g., FR-4). In this example embodiment, first substrate 1002 can include and/or provide the same functionality as that of first substrate 102 described above with reference to FIG. 1.

With reference to the example embodiment described above and illustrated in FIG. 1, in the example embodiment depicted in FIG. 10, antenna array 104 (not illustrated in FIG. 10) and/or one or more of antenna elements 104*a*, 104*b*, 104*c*, 104N (not illustrated in FIG. 10) can be disposed on (e.g., formed on and/or integrated into) a surface 1004 (e.g., a top surface) of first substrate 1002 such that at least one of antenna elements 104*a*, 104*b*, 104*c*, 104N is disposed on a curved section of surface 1004. In this example embodiment, surface 1004 can be formed as and/or include the same single concave and double convex curve configuration as that of first substrate 1002, relative to second substrate 110. In this example embodiment, one or more of surfaces 108*a*, 108*b*, 108*c*, 108N (not illustrated in FIG. 10) respectively corresponding to one or more of antenna elements 104*a*, 104*b*, 104*c*, 104N, can have the same curve configuration as that of surface 1004. For example, in some embodiments, one or more of surfaces 108*a*, 108*b*, 108*c*, 108N can have the same curve configuration as that of surface 1004 and be approximately coplanar to surface 1004. In some embodiments, one or more of surfaces 108*a*, 108*b*, 108*c*, 108N can have the same curve configuration as that of surface 1004 and can be formed on first substrate 1002 so as to be disposed in a plane adjacent to surface 1004 (e.g., a parallel or approximately parallel plane adjacent to surface 1004).

Figure 11:
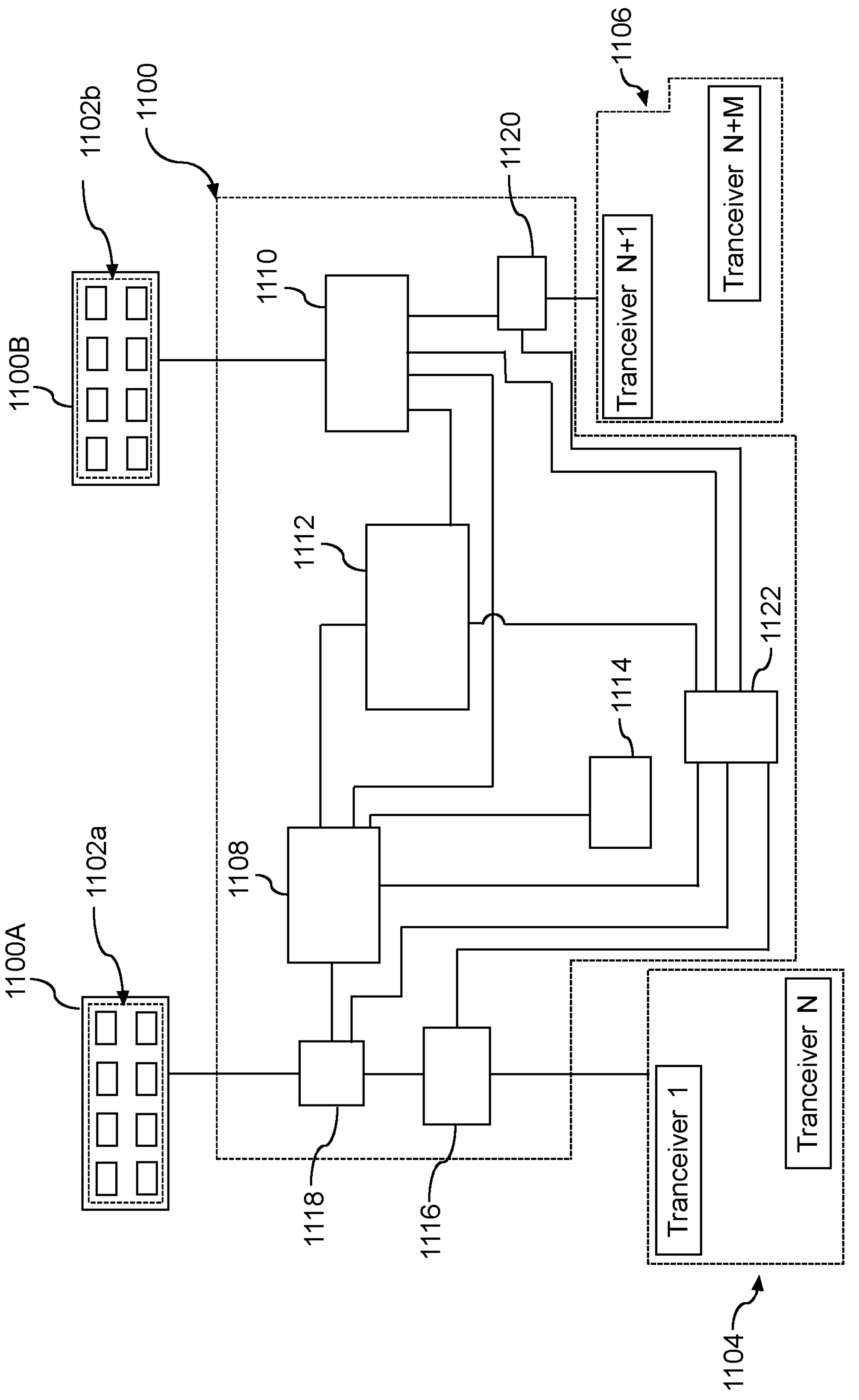
FIG. 11 illustrates a block diagram of an example, non-limiting control circuit that can be associated with one or more of the example, non-limiting antenna systems of the present disclosure to facilitate approximately equal gain in any direction relative to an antenna array in accordance with one or more example embodiments of the present disclosure.

FIG. 11 illustrates a block diagram of an example, non-limiting control circuit 1100 that can be associated with one or more of the example, non-limiting antenna systems of the present disclosure to facilitate approximately equal gain in any direction relative to an antenna array in accordance with one or more example embodiments of the present disclosure. For example, in various example embodiments of the present disclosure, control circuit 1100 can be associated with one or more of antenna system 100, 600, 700, 800, 900, and/or 1000 to facilitate approximately equal gain in any direction relative to an antenna array in accordance with one or more example embodiments of the present disclosure. In example embodiments of the present disclosure, control circuit 1100 can be included with and/or coupled to such antenna system(s) to configure one or more antenna arrays thereof to: communicate one or more signals (e.g., one or more RF signals); support communication of such one or more signals; and/or to perform a beam forming operation.

As illustrated in the example embodiment depicted in FIG. 11, control circuit 1100 can be coupled to a first antenna system 1100*a* and/or a second antenna system 1100*b*. In this example embodiment, first antenna system 1100*a* and/or second antenna system 1100*b* can include the same structure, material(s), and/or configuration as that of antenna system 100 described above with reference to FIG. 1. Additionally, or alternatively, in the example embodiment depicted in FIG. 11, first antenna system 1100*a* and/or second antenna system 1100*b* can further include and/or provide the same functionality as that of antenna system 100.

In the example embodiment depicted in FIG. 11, first antenna system 1100*a* and second antenna system 1100*b* can include a first antenna array 1102*a* and a second antenna array 1102*b*, respectively. In this example embodiment, first antenna array 1102*a* and/or second antenna array 1102*b* can include the same structure, material(s), and/or configuration as that of antenna array 104 described above with reference to FIG. 1. Additionally, or alternatively, in the example embodiment depicted in FIG. 11, first antenna array 1102*a* and/or second antenna array 1102*b* can further include and/or provide the same functionality as that of antenna array 104.

As illustrated in the example embodiment depicted in FIG. 11, first antenna array 1102*a* and second antenna array 1102*b* can each include a plurality of (e.g., 8) antenna elements (not annotated in FIG. 11) that can respectively include the same structure, material, and/or configuration as that of antenna elements 104*a*, 104*b*, 104*c*, 104N described above with reference to FIG. 1. Additionally, or alternatively, in the example embodiment depicted in FIG. 11, such a plurality of antenna elements can respectively include and/or provide the same functionality as that of antenna elements 104*a*, 104*b*, 104*c*, 104N.

In the example embodiment depicted in FIG. 11, control circuit 1100 can configure first antenna array 1102*a* and/or second antenna array 1102*b* according to one or more example embodiments of the present disclosure. For example, control circuit 1100 can configure first antenna array 1102*a* and/or second antenna array 1102*b* according to one or more example embodiments of the present disclosure to: communicate one or more signals (e.g., one or more RF signals); support communication of such one or more signals; and/or to perform a beam forming operation, where first antenna array 1102*a* and/or second antenna array 1102*b* can provide approximately equal gain in any direction relative to first antenna array 1102*a* and/or second antenna array 1102*b*, respectively.

FIG. 11 illustrates an example embodiment in which a first through $N^{th}$ protocols (where "$N^{th}$" refers to a total quantity of protocols) that can include a 5G communication protocol can be supported with first antenna array 1102*a* having a plurality of antenna elements (e.g., 8). In this example embodiment, second antenna array 1102*b* having a plurality of antenna elements (e.g., 8) can be used to support communications of first antenna array 1102*a* by being configured to perform a secondary function (e.g., MIMO, diversity, etc.) or being configured to perform a beam forming operation.

Control circuit 1100 according to example embodiments of the present disclosure can be operable to configure antenna elements of first antenna array 1102*a* and/or second antenna array 1102*b* between supporting a secondary function and supporting a beam forming operation.

As illustrated in the example embodiment depicted in FIG. 11, a first through $N^{th}$ transceivers 1104 (where "$N^{th}$" refers to a total quantity of transceivers 1104) can be associated with (e.g., coupled to) first antenna array 1102*a* to process signals according to the first through $N^{th}$ protocols, that can include a 5G communication protocol. Other protocols that can be supported by transceivers 1104 in example embodiments of the present disclosure can include, but are not limited to, a 2G protocol, 3G protocol, 4G long-term evolution (LTE) protocol, and/or another cellular communication protocol.

As further illustrated in the example embodiment depicted in FIG. 11, an $(N+1)^{th}$ through $(N+M)^{th}$ transceivers 1106 can be associated with (e.g., coupled to) second antenna array 1102*b* to perform an originally intended function in conjunction with one or more of the first through $N^{th}$ protocols, that can include a 5G communication protocol. Other protocols that can be supported by transceivers 1106 in example embodiments of the present disclosure can include, but are not limited to, a 2G protocol, 3G protocol, 4G (LTE) protocol, and/or another cellular communication protocol.

Control circuit 1100 depicted in the example embodiment illustrated in FIG. 11 can include a first switching component 1108 and a second switching component 1110. In this example embodiment, first switching component 1108 and second switching component 1110 can be coupled to each other via a phase shifting component 1112. In this example embodiment, phase shifting component 1112 can be configured to provide multiple phase shifts between signals communicated among antenna elements of first antenna array 1102*a* and/or second antenna array 1102*b* to implement beam forming functionality. For instance, in this embodiment, phase shifting component 1112 can include a plurality of transmission lines of differing electrical lengths that can serve as delay lines that can be selectively coupled to one or more antenna elements using first switching component 1108 and/or second switching component 1110. In additional and/or alternative embodiments, phase shifting component 1112 can include one or more phase shifters configured to implement phase shifts in signals communicated via phase shifting component 1112.

First switching component 1108 of the example embodiment depicted in FIG. 11 can include a plurality of first switches (e.g., transistors or other switching devices) that can be configured to selectively couple individual antenna elements of first antenna array 1102*a* to phase shifting component 1112. Second switching component 1110 of the example embodiment depicted in FIG. 11 can include a plurality of second switches (e.g., transistors or other switching devices) that can be configured to selectively couple individual antenna elements of second antenna array 1102*b* to phase shifting component 1112. In this example embodiment, first switching component 1108 can include a path to be open, grounded, or shorted to a component or module in the system, as represented by block 1114.

Control circuit 1100 depicted in the example embodiment illustrated in FIG. 11 can include a module 1116 that can be configured to select one or more of transceivers 1104 to be coupled to individual antenna elements of first antenna array 1102*a* during a time period. In this example embodiment, module 1116 can be coupled to a power combiner and/or splitter 1118 that can be configured to select between providing signals to first antenna array 1102*a* and/or first switching component 1108. In this example embodiment, control circuit 1100 can include a module 1120 that can be configured to select one or more of transceivers 1106 to be coupled to individual antenna elements of second antenna array 1102*b* during a time period.

In the example embodiment depicted in FIG. 11, a controller 1122 (e.g., a processor, microprocessor, and/or another type of controller that can be configured to execute computer readable instructions stored in one or more memory devices) can be coupled to various components of control circuit 1100, such as first switching component 1108, second switching component 1110, phase shifting component 1112, module 1116, module 1120, and/or power combiner and/or splitter 1118 to control the selection of paths and/or phase shifts.

Control circuit 1100 depicted in the example embodiment illustrated in FIG. 11 can control the elements to communicate one or more signals via a communication protocol by controlling module 1116 to couple a selected transceiver of transceivers 1104 to one or more antenna elements in first antenna array 1102*a*. In this example embodiment, the communication protocol can be, for instance, a 5G communication protocol. In this example embodiment, one or more of the antenna elements in first antenna array 1102*a* can be configured to communicate a signal via the communication protocol in a MIMO mode.

Control circuit 1100 depicted in the example embodiment illustrated in FIG. 11 can configure one or more of the antenna elements in second antenna array 1102*b* to be in a first mode or in a second mode. According to this example embodiment, in the first mode, one or more of the second antenna elements are configured to provide a secondary function (e.g., MIMO, diversity, etc.) to support communication of the first antenna elements via the communication protocol.

More particularly, in the example embodiment depicted in FIG. 11, when one or more antenna elements of second antenna array 1102*b* are used in a MIMO or diversity mode, controller 1122 can control second switching component 1110 and module 1120 to selectively couple one or more of the antenna elements of second antenna array 1102*b* to the appropriate transceiver of transceivers 1106. Additionally, or alternatively, in this example embodiment, controller 1122 can control first switching component 1108 to selectively couple one or more of the antenna elements of first antenna array 1102*a* to block 1114 (e.g., open, grounded, shorted, etc.). In this example embodiment, controller 1122 can also control components to otherwise decouple one or more antenna elements of first antenna array 1102*a* from one or more antenna elements of second antenna array 120.

In the example embodiment depicted in FIG. 11, when in the second mode, control circuit 1100 can control one or more of the antenna elements of second antenna array 1102*b* and/or first antenna array 1102*a* to support a beam forming operation performed on the first antenna elements. For instance, in this example embodiment, first switching component 1108 and second switching component 1110 can be controlled by controller 1122 to connect path(s) to phase shifting component 1112 so as to couple two or more antenna elements of first antenna array 1102*a* and/or second antenna array 1102*b*. In this example embodiment, phase shifting component 1112 can constitute and/or be configured to perform phase shifts between radiation patterns associated with the antenna elements to perform a beam forming operation.

Figure 12:
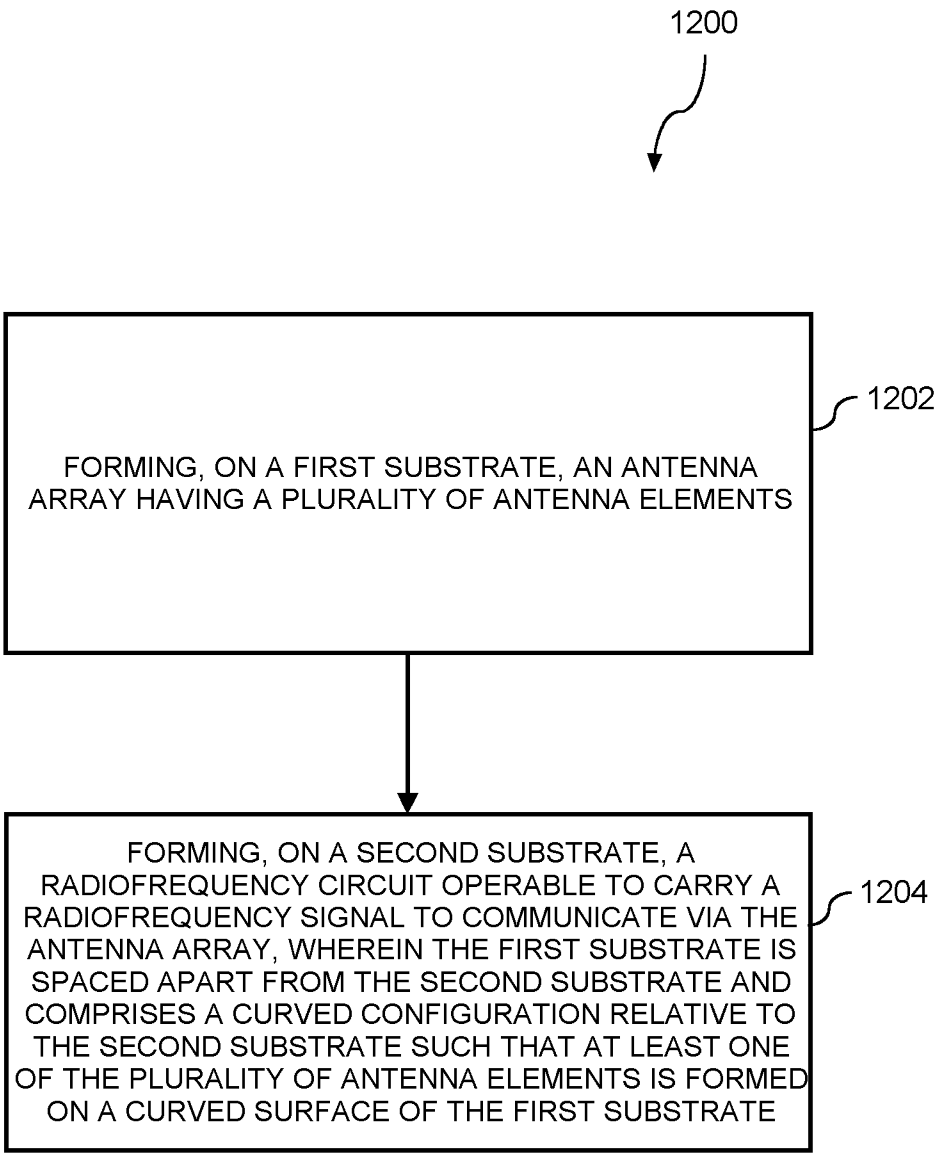
FIG. 12 illustrates a flow diagram of an example, non-limiting method that can be implemented to fabricate one or more example embodiments of the present disclosure.

FIG. 12 illustrates a flow diagram of an example, non-limiting method 1200 that can be implemented to fabricate one or more example embodiments of the present disclosure. For example, method 1200 can be implemented to fabricate antenna system 100, 600, 700, 800, 900, and/or 1000 and/or one or more components of such antenna system(s).

In the example embodiment illustrated in FIG. 12, at 1202, method 1200 can include forming, on a first substrate (e.g., first substrate 102), an antenna array (e.g., antenna array 104) having a plurality of antenna elements (e.g., antenna elements 104*a*, 104*b*, 104*c*, 104N). In some embodiments, at 1202, method 1200 can include forming, on the first substrate (e.g., first substrate 102), the antenna array (e.g., antenna array 104) having the plurality of antenna elements (e.g., antenna elements 104*a*, 104*b*, 104*c*, 104N), using an LDS process such that at least one of the antenna elements (e.g., at least one of antenna elements 104*a*, 104*b*, 104*c*, 104N) is disposed on a curved surface (e.g., surface 106) of the first substrate. For example, as described above with reference to FIG. 1, one or more of antenna elements 104*a*, 104*b*, 104*c*, 104N can be provided as LDS defined antenna elements. In these embodiments, one or more of antenna elements 104*a*, 104*b*, 104*c*, 104N can be formed on first substrate 102 using an LDS process such that at least one of antenna elements 104*a*, 104*b*, 104*c*, 104N is disposed on a curved surface (e.g., surface 106) of first substrate 102.

In this example embodiment, at 1204, method 1200 can include forming, on a second substrate (e.g., second substrate 110), a radio frequency circuit operable to carry a radio frequency signal to communicate via the antenna array, where the first substrate is spaced apart from the second substrate and comprises a curved configuration (e.g., a concave curved configuration, a convex curved configuration, etc.) relative to the second substrate such that at least one of the plurality of antenna elements is formed on a curved surface (e.g., surface 106) of the first substrate.

Figure 13:
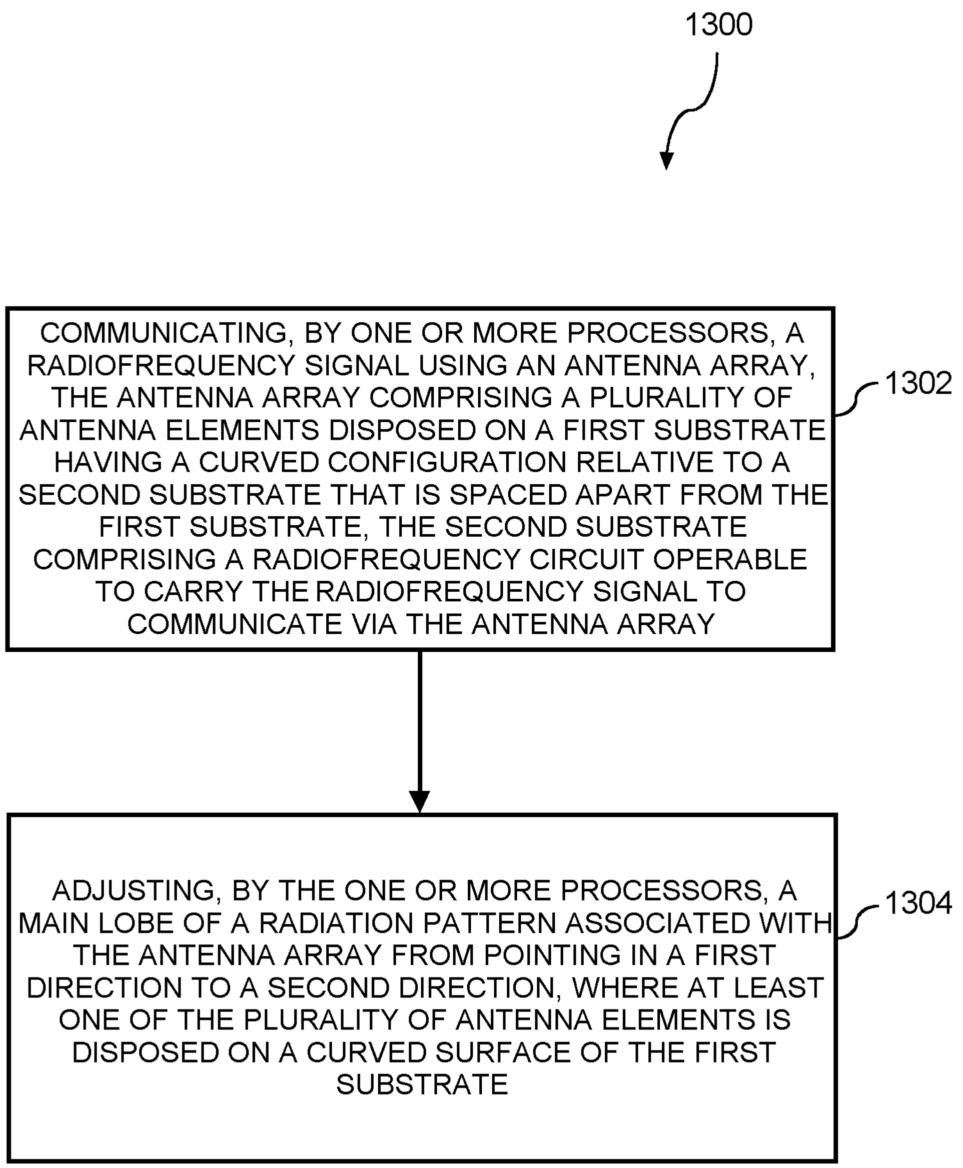
FIG. 13 illustrates a flow diagram of an example, non-limiting method that can be implemented to operate one or more example embodiments of the present disclosure.

FIG. 13 illustrates a flow diagram of an example, non-limiting method 1300 that can be implemented to operate one or more example embodiments of the present disclosure. For example, method 1300 can be implemented to operate one or more of antenna system 100, 600, 700, 800, 900, and/or 1000 using control circuit 1100 as described above with reference to the example embodiment illustrated in FIG. 11.

In the example embodiment illustrated in FIG. 13, at 1302, method 1300 can include communicating, by one or more processors (e.g., controller 1122), a radio frequency signal using an antenna array (e.g., antenna array 104), the antenna array comprising a plurality of antenna elements (e.g., antenna elements 104*a*, 104*b*, 104*c*, 104N) disposed on a first substrate (e.g., first substrate 102) having a curved configuration (e.g., a concave curved configuration, a convex curved configuration, etc.) relative to a second substrate (e.g., second substrate 110) that is spaced apart from the first substrate, the second substrate comprising a radio frequency circuit operable to carry the radio frequency signal to communicate via the antenna array.

In this example embodiment, at 1304, method 1300 can include adjusting, by the one or more processors (e.g., controller 1122), a main lobe (e.g., main lobe 502) of a radiation pattern (e.g., radiation pattern 500) associated with the antenna array from pointing in a first direction (e.g., first direction $D_1$) to a second direction (e.g., second direction $D_2$), where at least one of the plurality of antenna elements is disposed on a curved surface (e.g., surface 106) of the first substrate.

The method(s) described herein and/or illustrated in the accompanying figures (e.g., method 1200 and/or method 1300) in accordance with one or more example embodiments of the present disclosure depict steps performed in a particular order for purposes of illustration and discussion. Those of ordinary skill in the art, using the disclosures provided herein, will understand that various steps of any of such methods can be adapted, omitted, rearranged, include steps not illustrated, performed simultaneously, and/or modified in various ways without deviating from the scope of the present disclosure.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system, comprising:

a first substrate comprising an antenna array having a plurality of antenna elements; and a second substrate spaced apart from the first substrate and comprising a radio frequency circuit operable to carry a radio frequency signal to communicate via the antenna array, wherein the first substrate comprises a curved configuration relative to the second substrate, wherein at least one of the plurality of antenna elements is on the curved surface such that a surface of the antenna has the same curved configuration as the curved surface of the first substrate, wherein the curved configuration comprises one or more convex curve configurations and one or more concave curve configurations.

2. The antenna system of claim 1, wherein the first substrate comprises an end portion and a center portion, and wherein a first distance between the end portion and a surface of the second substrate is less than a second distance between the center portion and the surface of the second substrate.

3. The antenna system of claim 1, wherein the plurality of antenna elements are laser direct structuring defined antenna elements.

4. The antenna system of claim 1, further comprising one or more control devices, the one or more control devices operable to:

implement a beam forming operation to adjust a radiation pattern of the antenna array such that a main lobe of the radiation pattern is adjusted from pointing in a first direction to a second direction, wherein the main lobe is associated with a first gain in the first direction and a second gain in the second direction, and wherein the second gain is approximately equal to the first gain.

5. The antenna system of claim 4, wherein the first direction is in a generally perpendicular direction from a center point on the second substrate and the second direction is in a direction about 45 degrees from the center point on the second substrate.

6. The antenna system of claim 1, wherein the radio frequency circuit comprises:

a radio frequency feed circuit disposed on a first side of the second substrate; and a ground plane disposed on a second side of the second substrate, the second side opposite the first side, wherein the ground plane comprises one or more slots, and wherein the radio frequency feed circuit is operable to couple the radio frequency signal to one or more of the plurality of antenna elements via the one or more slots.

7. The antenna system of claim 6, wherein at least one first slot of the one or more slots extends in a first direction and at least one second slot of the one or more slots extends in a second direction, and wherein the first direction is generally perpendicular to the second direction.

8. The antenna system of claim 1, wherein the plurality of antenna elements are a plurality of radiating elements of a plurality of patch antennas.

9. The antenna system of claim 1, wherein one or more of the plurality of antenna elements are operable to communicate one or more signals or to support communication of the one or more signals via a cellular communication protocol.

10. A method of manufacturing an antenna system, comprising:

forming, on a first substrate, an antenna array having a plurality of antenna elements; and forming, on a second substrate, a radio frequency circuit operable to carry a radio frequency signal to communicate via the antenna array, wherein the first substrate is spaced apart from the second substrate and comprises a curved configuration relative to the second substrate, wherein at least one of the plurality of antenna elements is on the curved surface such that a surface of the antenna has the same curved configuration as the curved surface of the first substrate, wherein the curved configuration comprises one or more convex curve configurations and one or more concave curve configurations.

11. The method of claim 10, wherein the forming, on the first substrate, the antenna array having the antenna elements comprises:

forming, on the first substrate, the antenna elements using a laser direct structuring process.

12. The method of claim 10, wherein the forming, on the second substrate, the radio frequency circuit operable to carry the radio frequency signal to communicate via the antenna array comprises:

forming a radio frequency feed circuit on a first side of the second substrate; and forming a ground plane comprising one or more slots on a second side of the second substrate, the second side opposite the first side, wherein the radio frequency feed circuit is formed on the first side of the second substrate such that it is operable to couple the radio frequency signal to one or more of the plurality of antenna elements via the one or more slots.

13. The method of claim 12, further comprising:

forming the ground plane comprising the one or more slots on the second side of the second substrate such that at least one first slot of the one or more slots extends in a first direction and at least one second slot of the one or more slots extends in a second direction, wherein the first direction is generally perpendicular to the second direction.

14. A method of configuring an antenna system, comprising:

communicating, by one or more processors, a radio frequency signal using an antenna array, the antenna array comprising a plurality of antenna elements disposed on a first substrate having a curved configuration relative to a second substrate that is spaced apart from the first substrate, the second substrate comprising a radio frequency circuit operable to carry the radio frequency signal to communicate via the antenna array, at least one of the plurality of antenna elements is on the curved surface such that a surface of the antenna has the same curved configuration as the curved surface of the first substrate, wherein the curved configuration comprises one or more convex curve configurations and one or more concave curve configurations; and adjusting, by the one or more processors, a main lobe of a radiation pattern associated with the antenna array from pointing in a first direction to a second direction, wherein at least one of the plurality of antenna elements is disposed on a curved surface of the first substrate.

15. The method of claim 14, wherein the main lobe is associated with a first gain in the first direction and a second gain in the second direction, and wherein the second gain is approximately equal to the first gain.

16. The method of claim 14, wherein the first direction is in a generally perpendicular direction from a center point on the second substrate and the second direction is in a direction about 45 degrees from the center point on the second substrate.

17. The method of claim 14, wherein the adjusting, by the one or more processors, the main lobe of the radiation pattern from pointing in the first direction to the second direction comprises:

adjusting, by the one or more processors, at least one of power or phase of the radio frequency signal to one or more of the plurality of antenna elements.

18. The method of claim 14, further comprising:

operating, by the one or more processors, one or more of the plurality of antenna elements based at least in part on the radio frequency signal to communicate one or more signals or to support communication of the one or more signals via the antenna array and a cellular communication protocol in at least one of a multiple input multiple output mode or a diversity mode in a frequency band range of about 24 gigahertz to about 86 gigahertz.

* * * * *